C. B. HALSTEAD.
ANIMAL THROWING DEVICE.
APPLICATION FILED APR. 13, 1911.
1,028,352.
Patented June 4, 1912.
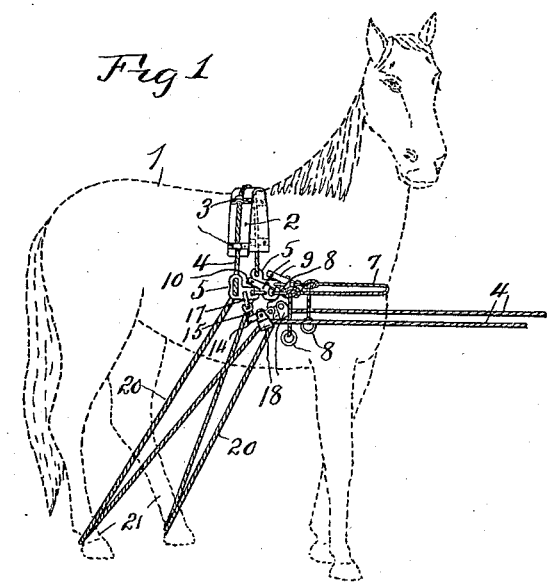
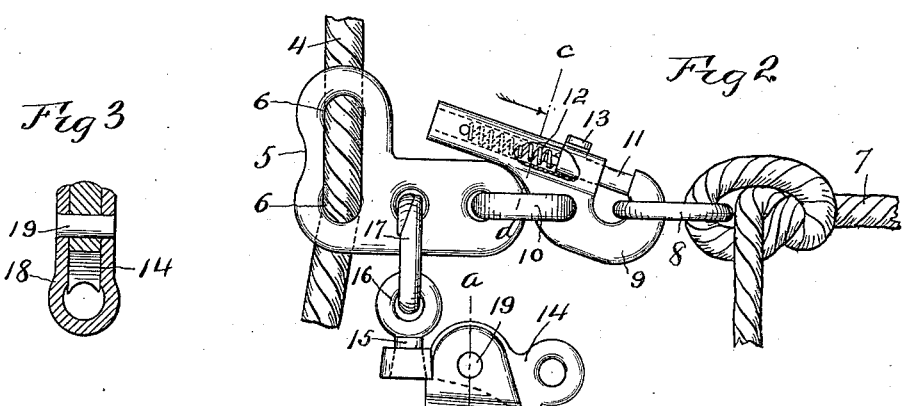
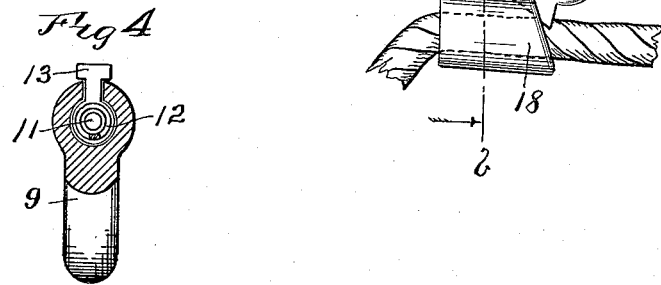
WITNESSES:
R. E. Hamilton
E. B. House
INVENTOR.
Charles B. Halstead
BY
Warren O. House
His ATTORNEY.
COLUMBIA PLANOGRAPH CO., WASHINGTON, D. C.

UNITED STATES PATENT OFFICE.

CHARLES B. HALSTEAD, OF KANSAS CITY, MISSOURI.

ANIMAL-THROWING DEVICE.

1,028,352.  Specification of Letters Patent.  Patented June 4, 1912.

Application filed April 13, 1911. Serial No. 620,910.

*To all whom it may concern:*

Be it known that I, CHARLES B. HALSTEAD, a citizen of the United States, residing at Kansas City, in the county of Jackson and State of Missouri, have invented certain new and useful Improvements in Animal-Throwing Devices, of which the following is a specification.

My invention relates to improvements in animal throwing devices. It is particularly adapted to be used in throwing horses.

One object of my invention is to provide a device by which an animal may be quickly and easily thrown.

Another object of my invention is to provide a device which may be easily adjusted for use upon animals of different sizes.

A further object of my invention is to provide a device which may be easily released and removed from a thrown animal.

The novel features of my invention are hereinafter fully described and claimed.

In the accompanying drawings which illustrate one form of my invention, Figure 1 is a perspective view of the device mounted on a horse which is represented in dotted lines. Fig. 2 is an enlarged fragmental side elevation, showing one of the clamping devices, one of the supporting members, a part of the throwing rope, and a part of the breast embracing device. Fig. 3 is a cross section on the line *a—b* of Fig. 2. Fig. 4 is a cross section on the line *c—d* of Fig. 2.

Similar reference characters designate similar parts.

1 designates a horse on the back of which is mounted a saddle 2, preferably of flexible material, such as leather, and having on its upper side loops 3 through which extends a throwing rope 4 upon which the saddle is adjustable lengthwise of the rope. Mounted on the rope 4 at opposite ends of the saddle 2 are two members which are preferably adjustable lengthwise of the rope. Said two members comprise preferably two plates 5 which in the operative position are vertically disposed, and which are each provided with two transverse holes 6 disposed one above the other and through which the rope 4 extends. When the rope 4 is in a slack condition the plates 5 may be adjusted to different positions along the rope, but when the rope is taut the plates 5 will be held tightly in position.

A breast embracing device is secured to the plates 5. Preferably this device is provided with means for detachment from one or both plates 5 for releasing the apparatus from the animal after the animal has been thrown. The breast embracing device in its preferred form comprises a rope 7, which has secured to it adjacent its ends two or more rings 8 which are adapted to releasably engage two hook members 9 pivotally connected respectively to the forward ends of the plates 5 by links 10. The hook members 9 may each be of the ordinary kind provided with a slidable bolt 11 adapted to be held in a position bridging the opening in the hook by a coil spring 12. The bolt 11 is provided with a button 13 by which the bolt may be retracted to the open position against the pressure of the spring to release the adjacent link 10. When the bolt has been retracted and the hook member 9 turned to the proper position, the ring 8 engaged by the hook member will be released.

Two clamping devices are respectively supported by the members or plates 5. These clamping devices are adapted to clamp the rope 4 to hold it from being drawn in one direction, but which permit it to be drawn in the other direction. Each of said clamping devices comprises preferably the following described mechanism. A lever 14 has secured to its rear end a stud 15 which may be rotatively mounted in the lever 14, and which is provided at its upper end with an eye 16, which has mounted in it a link 17, which is pivoted to the plate 5, as shown in Fig. 2. A U shaped stirrup 18 has mounted between its arms the adjacent lever 14 to which the stirrup is pivoted by means of a horizontal pin 19 which extends through the lever between the ends of the lever. The rope 4 has its ends extending respectively forwardly through the stirrups 18 with which the rope has a running connection and between which and the plates 5 the rope forms two loops 20, which, as shown in Fig. 1, are adapted to engage the hind legs 21 of the horse, which is designated by 1. The forward free ends of the levers 14 are adapted to coöperate with the stirrups 18 to clamp the rope 4 to prevent the rope being drawn rearwardly through the stirrups. By reason of the stirrups being pivoted to the levers 14 intermediate of the ends of the levers, the rope 4 may be drawn forwardly through the stirrups for the purpose of shortening the loops 20, when it is desired to throw the animal.

In operating my invention, the device is mounted in the manner already described, with the loops 20 engaging the hind legs of the animal at points near the animal's feet. If now either end of the rope 4 be drawn forwardly the adjacent loop 20 will be shortened, thereby drawing up the leg engaged by that loop and permitting the animal to be easily thrown. After the animal has been thrown, either of the hook members 9 may be swung to a position in which the adjacent ring 8 will be released from the hook member, when the bolt 11 of the hook member has been retracted as already described. The apparatus may then be readily removed from the animal.

By providing a plurality of rings 8 at different distances from the ends of the rope 7, the device may be adapted to animals of different sizes.

By providing a single rope 4 which is longitudinally adjustable on the saddle 2 and has a running connection with the plates 5, the rope 4 may be shifted in the saddle 2 and plates 5 so as to present fresh wearing surfaces at points where the most wear occurs, and this may be done without changing the breast strap 7 and saddle 2 from their proper operative positions.

I do not limit my invention to the structure shown and described, as many modifications, within the scope of the appended claims are contemplated by me and may be made without departing from the spirit of my invention.

Having thus described my invention, what I claim and desire to secure by Letters Patent, is:—

1. In an animal throwing device, a throwing rope adapted to extend across and be supported by an animal's back, two members supported by and through which the rope is adjustable lengthwise, a breast embracing device secured to said members, and two clamping devices respectively supported by said members, the rope having a running connection with said devices and forming between the said devices and said members two loops for respectively engaging the hind legs of the animal, the clamping devices having means by which the rope may be drawn therethrough in one direction for shortening the loops, but which will clampingly engage the rope to prevent its being drawn in the opposite direction.

2. In an animal throwing device, a throwing rope adapted to extend across and be supported by an animal's back, two plates which in the operative position are vertically disposed and which are each provided with two transverse holes through which the rope extends, a breast embracing device secured to said plates, and two clamping devices respectively supported by said plates, the rope having a running connection with said clamping devices and forming between said devices and said plates two loops for respectively engaging the hind legs of the animal, the clamping devices having each means by which the rope may be drawn in one direction for shortening the adjacent loop, but which will clampingly engage the rope to prevent its being drawn in the opposite direction.

3. In an animal throwing device, a throwing rope adapted to extend across and be supported by an animal's back, two plates which in the operative position are vertically disposed and which are each provided with two transverse holes through which the rope extends, a breast embracing device secured to said plates, two levers pivotally supported at one set of ends by said plates respectively, and two stirrups with which the rope has a running connection and which are pivotally supported by said levers respectively at points between the ends of the levers, the free ends of the levers being adapted to coöperate with the stirrups respectively to clamp the rope to prevent its being drawn in one direction through the stirrups, but which permit the rope to be drawn through the stirrups in the opposite direction, the rope between the plates and the stirrups forming two loops for respectively engaging the hind legs of the animal.

4. In an animal throwing device, a throwing rope adapted to extend across and be supported by the back of an animal, two members supported by and through which the rope is adjustable lengthwise, a breast embracing device secured to said members, two levers pivotally supported at one set of ends by said two members respectively, and two stirrups with which the rope has a running connection and between which and said two members the rope forms two loops for respectively engaging the hind legs of the animal, said two stirrups being pivotally supported by said levers respectively at points between the ends of the levers, the free ends of the levers coöperating with said stirrups respectively to clamp the rope to prevent its being withdrawn in one direction through said stirrups, but which permits it to be drawn in the opposite direction to respectively shorten said loops.

5. In an animal throwing device, a throwing rope, a saddle supporting the rope and through which the rope is adjustable lengthwise, two members supported by the rope at opposite ends of the saddle and through which the rope is adjustable, a breast embracing device secured to said members, and two clamping devices respectively supported by said members, the rope having a running connection with said clamping devices and forming between the clamping devices and said members two loops for respectively engaging the hind legs of an animal, each clamping device having means for clamping the rope to prevent the rope being drawn in one direction therethrough, but which permits the rope being drawn in the opposite direction to shorten the adjacent loop.

6. In an animal throwing device, a throwing rope, a saddle supporting the rope and through which the rope is adjustable lengthwise, two plates which in the operative position are vertically disposed, each plate having two transverse holes through which the rope extends, the plates being located at opposite ends of the saddle, a breast embracing device secured to said plates, and two clamping devices with which the rope has a running connection, the rope forming between said plates and said clamping devices two loops for respectively engaging the hind legs of an animal, each clamping device having means for clamping the rope to prevent the rope being drawn therethrough in one direction, but which permits the rope being drawn in the opposite direction for shortening the adjacent loop.

7. In an animal throwing device, a throwing rope, a saddle supporting the rope and through which the rope is adjustable lengthwise, two members supported by the rope at opposite ends of the saddle and through which the rope is adjustable, a breast embracing device secured to said members, two levers pivoted at one set of ends to said members, and two stirrups with which the rope has a running connection and between which and the two members the rope forms two loops for respectively engaging the hind legs of an animal, the two stirrups being pivotally supported by said levers respectively at points between the ends of the levers, the free ends of the levers coöperating respectively with said stirrups to clamp the rope to prevent its being drawn in one direction through the stirrups, but which permits its being drawn in the opposite direction therethrough for shortening said loops.

8. In an animal throwing device, a throwing rope, a saddle supporting the rope and through which the rope is adjustable lengthwise, two members supported by the rope at opposite ends of the saddle and through which the rope is adjustable lengthwise, a breast embracing device detachably secured to said members, two levers pivotally supported at one set of ends by said members, and two stirrups with which the rope has a running connection and between which and said members the rope forms two loops for respectively engaging the hind legs of an animal, the stirrups being pivotally supported by the levers at points between the ends thereof, the free ends of the levers coöperating with the stirrups respectively to clamp the rope to prevent its being drawn in one direction through the stirrups, but which permits it being drawn therethrough in the opposite direction to shorten said loops.

In testimony whereof I have signed my name to this specification in presence of two subscribing witnesses.

CHARLES B. HALSTEAD.

Witnesses:
E. B. HOUSE,
FLORENCE M. VENDIG.

---

Copies of this patent may be obtained for five cents each, by addressing the "Commissioner of Patents, Washington, D. C."